(12) United States Patent
Langer

(10) Patent No.: US 7,822,775 B2
(45) Date of Patent: Oct. 26, 2010

(54) METHOD AND SYSTEM FOR MANAGING COMPLEX DATABASE INFORMATION

(75) Inventor: Matthias Langer, Malsch (DE)

(73) Assignee: SAP AG, Walldorf (DE)

( * ) Notice: Subject to any disclaimer, the term of this patent is extended or adjusted under 35 U.S.C. 154(b) by 246 days.

(21) Appl. No.: 11/780,938

(22) Filed: Jul. 20, 2007

(65) Prior Publication Data

US 2009/0024569 A1 Jan. 22, 2009

(51) Int. Cl.
*G06F 7/00* (2006.01)
*G06F 17/30* (2006.01)
(52) U.S. Cl. .................... 707/792; 707/717
(58) Field of Classification Search ........ 707/791–812, 707/713–721, 999.002–999.005
See application file for complete search history.

(56) References Cited

U.S. PATENT DOCUMENTS

| 6,032,158 | A | 2/2000 | Mukhopadhyay et al. | |
|---|---|---|---|---|
| 6,205,451 | B1 * | 3/2001 | Norcott et al. | 707/204 |
| 6,212,524 | B1 | 4/2001 | Weissman et al. | |
| 6,510,457 | B1 * | 1/2003 | Ayukawa et al. | 709/217 |
| 7,020,649 | B2 * | 3/2006 | Cochrane et al. | 707/3 |
| 7,290,214 | B2 * | 10/2007 | Sidle et al. | 715/748 |
| 2005/0044493 | A1 * | 2/2005 | Chen et al. | 715/531 |
| 2005/0080803 | A1 * | 4/2005 | Sauermann | 707/101 |
| 2005/0261888 | A1 * | 11/2005 | Chen et al. | 703/22 |
| 2006/0036574 | A1 * | 2/2006 | Schweigkoffer et al. | 707/2 |
| 2006/0230079 | A1 * | 10/2006 | Strahl et al. | 707/203 |
| 2007/0043693 | A1 * | 2/2007 | Krieg | 707/1 |
| 2008/0037854 | A1 * | 2/2008 | Grossman et al. | 382/135 |

OTHER PUBLICATIONS

Burleson, Donald K., "Oracle and SAP", Oracle SAP Administration, Chapter 1, 1st Edition, http://www.oreilly.com/catalog/sapadm/chapter/ch01.html, (Nov. 1999).
Extended European Search Report for Application No. 08011353.3, mailed Sep. 22, 2008, 7 pages.
Mumick, I. S., et al, "Maintenance of Data Cubes and Summary Tables in a Warehouse", ACM Proceedings of Sigmod, vol. 26, No. 2 (Jun. 1, 1997), pp. 100-111.
ORACLE, "Managing Clusters", Oracle Corporation, Oracle8i Administrator's Guide, Release 8.1.5 (Feb. 1999), 8 pages.
"HR ABAP Payroll", Softron Systems (2001), 6 pages.

* cited by examiner

*Primary Examiner*—Shew-Fen Lin
(74) *Attorney, Agent, or Firm*—Brake Hughes Bellermann LLP

(57) ABSTRACT

Methods and systems are described for storage and retrieval of complex data. An example method may store a first data item in a first data table included in a database. An aggregated data object may be generated based on preprocessing the first data table based on satisfying a predefined retrieval query. The aggregated data object may be stored based on a preprocessed format in a cluster table included in the database. The first data table may be updated, and the aggregated data object may be updated in the cluster table based on the update of the first data table.

20 Claims, 3 Drawing Sheets

METHOD AND SYSTEM FOR MANAGING COMPLEX DATABASE INFORMATION

TECHNICAL FIELD

This description relates to techniques for managing complex database information.

BACKGROUND

Complex data models may include storage of information in a large number of data tables, for example, in a relational database. Retrieval of needed information may thus require a significant amount of time to retrieve the information from the data tables, and to process requested information, especially if underlying data models are based on mass data. For example, in manufacturing environments such as automotive assembly environments, a database may store massive amounts of information associated with various parts that may be needed to assemble automobiles. Further, for example, many of the parts may vary from one particular model to another. For example, a door of a minivan may include very different characteristics from a door of a compact automobile. Additionally, a rear door of a hatchback automobile may include very different characteristics, and may include very different related parts, from a driver side door of a large sedan automobile. Thus, an automobile "door" may include many variations. Databases for storing information associated with such parts may include very large amounts of related information for all variations needed for assembling various models of automobiles, with variations within each model. Further, such information may change over time, and may thus need to be updated within the database.

Integrated Product and Process Engineering (iPPE) may include a master data model for configurable products/materials that have many variants. iPPE may support concurrent product development and production process design, which may reduce time to market. It may include the collection of engineering- and manufacturing-specific information, such as bills of materials (BOMs), routings, and line designs in a single, integrated model, and may be particularly suited to repetitive manufacturing of products with a large number of variants.

However, when information is stored in conventional data tables in a database, data may need to be retrieved from each table included in the data base that is associated with the data model. A very large application object with massive amounts of data may require processing by multiple interfaces when reading large amounts of this data, which may adversely affect performance. For example, for retrieval of iPPE data, multiple application programming interfaces (APIs) may be invoked to retrieve all information that may be needed by various applications. The retrieval time and processing time for execution of such APIs in reading information from a database may significantly affect the performance of a system such as a manufacturing system.

Thus, it may be desirable to provide techniques for managing storage and retrieval of complex database information.

SUMMARY

According to one general aspect, a system includes a database storage area including a plurality of data tables configured to store relational database data items, and a cluster table configured to store data objects. The system further includes a data hub manager including a data table update processor configured to store a first data item in a first one of the data tables, an aggregated object processor configured to generate an aggregated data object based on preprocessing the first data table based on satisfying a predefined retrieval query, and a data hub storage manager configured to store the aggregated data object based on a preprocessed format in the cluster table. The data table update processor may be configured to update the first data table, and the data hub manager may further include a data hub update processor configured to update the aggregated data object in the cluster table based on the updating the first data table.

According to yet another aspect, a method includes storing a first data item in a first data table included in a database. The method further includes generating an aggregated data object based on preprocessing the first data table based on satisfying a predefined retrieval query, and storing the aggregated data object based on a preprocessed format in a cluster table included in the database. The method further includes updating the first data table, and updating the aggregated data object in the cluster table based on the updating the first data table.

According to yet another aspect, a computer program product is tangibly embodied on a computer-readable medium and is configured to cause a data processing apparatus to store a first data item in a first data table included in a database. The computer program product is further configured to cause the data processing apparatus to generate an aggregated data object based on preprocessing the first data table based on satisfying a predefined retrieval query, and store the aggregated data object based on a preprocessed format in a cluster table included in the database. The computer program product is further configured to cause the data processing apparatus to update the first data table, and update the aggregated data object in the cluster table based on the updating of the first data table.

The details of one or more implementations are set forth in the accompanying drawings and the description below. Other features will be apparent from the description and drawings, and from the claims.

DETAILED DESCRIPTION

Figure 1:
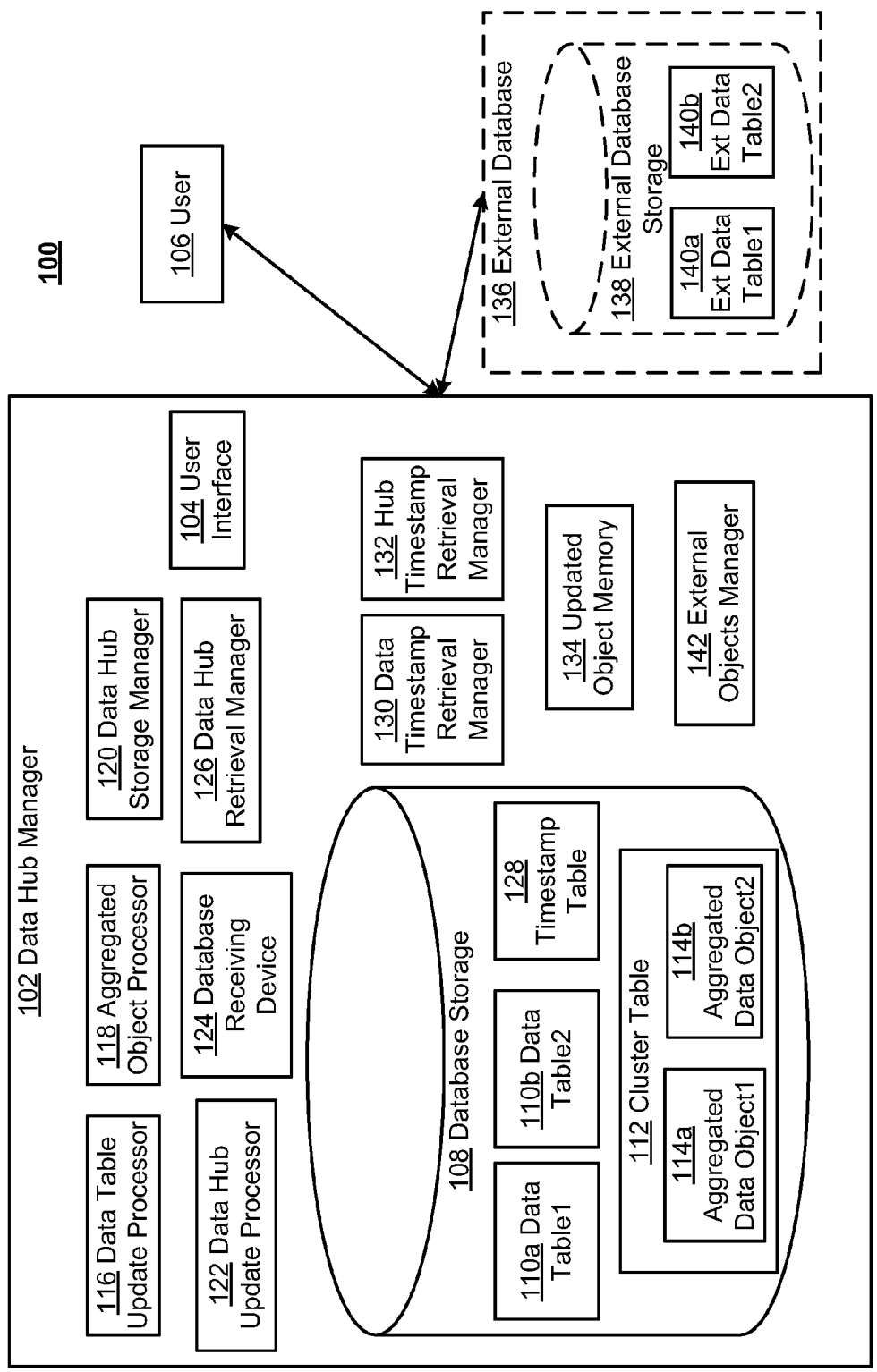
FIG. 1 is a block diagram of an example system for managing complex database information.

FIG. 1 is a block diagram of a system 100 for managing complex database information. In the example of FIG. 1, a data hub manager 102 includes various processing engines that may be configured to manage complex database information. According to an example embodiment, the data hub manager 102 may include a user interface 104 configured to manage communication with a user 106.

According to an example embodiment, the data hub manager 102 may include a database storage area 108 for storing database information. The database storage area 108 may include data tables 110a, 110b configured to store relational database data items and a cluster table 112 configured to store data objects. For example, the data tables 110a, 110b may be configured to store normal data records associated with a relational database. According to an example embodiment, the data tables 110*a*, 110*b* may be configured to store data items including integrated Product and Process Engineering (iPPE) objects, and the data tables 110*a*, 110*b* may include iPPE data tables.

According to an example embodiment, the cluster table 112 may be configured to store aggregated data objects 114*a*, 114*b*. For example, the aggregated data objects 114*a*, 114*b* may include data combined from multiple tables such as the data tables 110*a*, 110*b* into one physical record in the database. For example, the aggregated data objects 114*a*, 114*b* may include data written to the database in compressed form, or in a binary format that is not easily interpreted by a human, or by programs or applications external to the data hub manager 102. According to an example embodiment, the aggregated data objects 114*a*, 114*b* may be very large, in comparison to any one of the data tables 110*a*, 110*b*. According to an example embodiment, retrieval of data from the cluster table 112 may be very fast if a primary key is known.

According to an example embodiment, the cluster table 112 may be defined in the data dictionary as a transparent table. According to an example embodiment, special language elements such as EXPORT TO DATABASE, IMPORT FROM DATABASE and DELETE FROM DATABASE may be used to process data associated with the cluster table 112. For example, an EXPORT instruction may be used to update the aggregated data object 114*a* based on data items stored in data tables 110*a*, 110*b*.

According to an example embodiment, the data hub manager 102 may include a data table update processor 116 configured to store data items in the data tables 110*a*, 110*b*. For example, the data table update processor 116 may be configured to store a first data item in a first one of the data tables 110*a*, 110*b*.

According to an example embodiment, the data hub manager 102 may include an aggregated object processor 118 configured to generate an aggregated data object based on preprocessing the first data table based on satisfying a predefined retrieval query. For example, the aggregated object processor 118 may be configured to generate one of the aggregated data objects 114*a*, 114*b* based on preprocessing one or more of the data tables 110*a*, 110*b*. For example, the preprocessing may be based on satisfying a predefined retrieval query. Thus, if a particular retrieval query is used many times by a user of a database having mass data, the retrieval query may be specified by the user to preprocess data from the normal data tables 110*a*, 110*b*, as well as data from other sources, to generate one of the aggregated data objects 114*a*, 114*b*, which may be stored in the cluster table 112 in compressed form.

According to an example embodiment, the data hub manager 102 may include a data hub storage manager 120 configured to store the aggregated data objects 114*a*, 114*b* based on a preprocessed format in the cluster table 112. Thus, when the user 106 needs to retrieve the data based on the retrieval query, one of the aggregated data objects 114*a*, 114*b* may be retrieved as a result of executing one instruction and one fetch from storage, instead of executing several instructions to process multiple fetches from the data tables 110*a*, 110*b*. The data item information may thus be stored simultaneously in the data tables 110*a*, 110*b* and in the cluster table 112, so that the user 106 may retrieve desired information from the data tables 110*a*, 110*b* or from the cluster table 112

According to an example embodiment, the data table update processor 116 may be configured to update the data tables 110*a*, 110*b*, and the data hub manager 102 may include a data hub update processor 122 configured to update one of the aggregated data objects 114*a*, 114*b* in the cluster table 112 based on the update of the data table 110*a*, 110*b*.

According to an example embodiment, the data hub manager 102 may include a database receiving device 124 configured to receive a request based on the predefined retrieval query. For example, the request may be received from the user 106 via the user interface 104. According to an example embodiment, the data hub manager 102 may include a data hub retrieval manager 126 configured to retrieve one of the aggregated data objects 114*a*, 114*b* from the cluster table 112 in response to the request.

According to an example embodiment, the database storage area 108 may include a timestamp data table 128 configured to store indicators of times associated with updates of data items in tables. For example, the timestamp data table 128 may be configured to store indicators of times associated with updates of data items in the data tables 110*a*, 110*b*. For example, the timestamp data table 128 may be further configured to store indicators of times associated with updates of the cluster table 112, for example, updates based on data items from sources external to the data hub.

According to an example embodiment, the data table update processor 116 may be configured to update one of the data tables 110*a*, 110*b* including updating data items in the data tables 110*a*, 110*b* and storing, in the timestamp data table 128 included in the database, an indicator indicating a time associated with the update of the data table.

According to an example embodiment, the data hub update processor 122 may be configured to update one of the aggregated data objects 114*a*, 114*b* in the cluster table 112 including retrieving the indicator indicating the time associated with the update of the data table and storing the updated aggregated data object 114*a*, 114*b* and the indicator indicating the time associated with the update of the data table in the cluster table 112.

According to an example embodiment, the data hub manager 102 may include a data timestamp retrieval manager 130 configured to retrieve an indicator indicating a most recent time associated with the update of the first data table from the timestamp data table. According to an example embodiment, the data hub manager 102 may further include a hub timestamp retrieval manager 132 configured to retrieve, from the cluster table 112, an indicator indicating the time associated with the update of the data table 110*a*, 110*b* that is most recently saved in the cluster table 112.

According to an example embodiment, the data hub retrieval manager 126 may be configured to retrieve one of the aggregated data objects 114*a*, 114*b* from the cluster table 112 in response to a request based on the predefined retrieval query received by the database receiving device 124, based on determining whether the indicator retrieved from the timestamp data table 128 matches the indicator retrieved from the cluster table 112. For example, if the two indicators match, the data hub retrieval manager 126 may retrieve one of the aggregated data objects 114*a*, 114*b* from the cluster table 112, and if the two indicators do not match, the data hub retrieval manager 126 may wait for the cluster table to be updated before retrieving one of the aggregated data objects 114*a*, 114*b* from the cluster table 112 in response to the request.

According to an example embodiment, the data hub manager 102 may include an updated object memory 134 configured to temporarily store objects associated with updates of data tables included in the database. For example, if one of the data tables 110*a*, 110*b* is updated via an add, modify, or delete operation, objects associated with the update may be stored in the updated object memory 134 so that the data hub manager 102 may "remember" the objects associated with the update so that the cluster table 112 may be updated in accordance with the update to the data tables 110a, 110b.

According to an example embodiment, the data table update processor 122 may be configured to update the data table including saving, in the updated object memory 134, an object associated with the update of the data table, and the data hub update processor 122 may be configured to update one of the aggregated data objects 114a, 114b in the cluster table 112 including selecting the aggregated data object 114a, 114b in the cluster table 112 for update based on the object saved in the updated object memory 134.

According to an example embodiment, the updated object memory 134 may be configured to temporarily store objects associated with sources external to the database for further update of the cluster table 112 based on the objects from the external sources. For example, the user 106 may request an update of one of the aggregated data objects 114a, 114b based on objects from one or more external sources.

According to an example embodiment, an external database 136 may be located external to the database included in the data hub manager 102, and the external database 136 may include an external database storage area 138 that may include external data tables 140a and 140b.

According to an example embodiment, the data hub manager 102 may include an external objects manager 142 configured to process requests to update the aggregated data objects 114a, 114b based on one or more data items stored in one or more of the external data tables 140a, 140b included in the external database 136 that is located external to the database. According to an example embodiment, the data hub update processor 122 may be configured to update the aggregated data objects 114a, 114b in the cluster table 112 based on preprocessing one or more of the external data tables 140a, 140b based on satisfying the predefined retrieval query. For example, the user 106 may need information from external sources in addition to information from the database in order to satisfy one or more frequently used queries, and may thus include the external information in the aggregated data objects 114a, 114b stored in the cluster table 112. As discussed previously, the special language elements such as EXPORT TO DATABASE, IMPORT FROM DATABASE and DELETE FROM DATABASE may be used to process data associated with the cluster table 112. For example, an EXPORT instruction may be used to update the aggregated data object 114a based on data items stored in the external data tables 140a, 140b.

According to an example embodiment, the external objects manager 142 may be configured to process requests to update the aggregated data objects 114a, 114b based on one or more data items stored in one of the external data tables 140a, 140b included in the external database 136 that may be located external to the database, including storing, in the timestamp data table 128, an external update indicator indicating a time associated with the update of one of the aggregated data objects 114a, 114b based on the one or more data items.

According to an example embodiment, the data hub update processor 122 may be configured to update the aggregated data objects 114a, 114b in the cluster table 112 based on preprocessing one of the external data tables 140a, 140b based on satisfying the predefined retrieval query. The data hub update processor 122 may then store the updated aggregated data object 114a, 114b and the external update indicator in the cluster table 112. Thus, the indicators may be checked for matching values, for example, by the data hub retrieval manager 126, to ensure retrieval of information based on the most recent updates.

According to an example embodiment, the data hub manager 102 may be based on Advanced Business Application Programming (ABAP) methods and objects.

Figure 2:
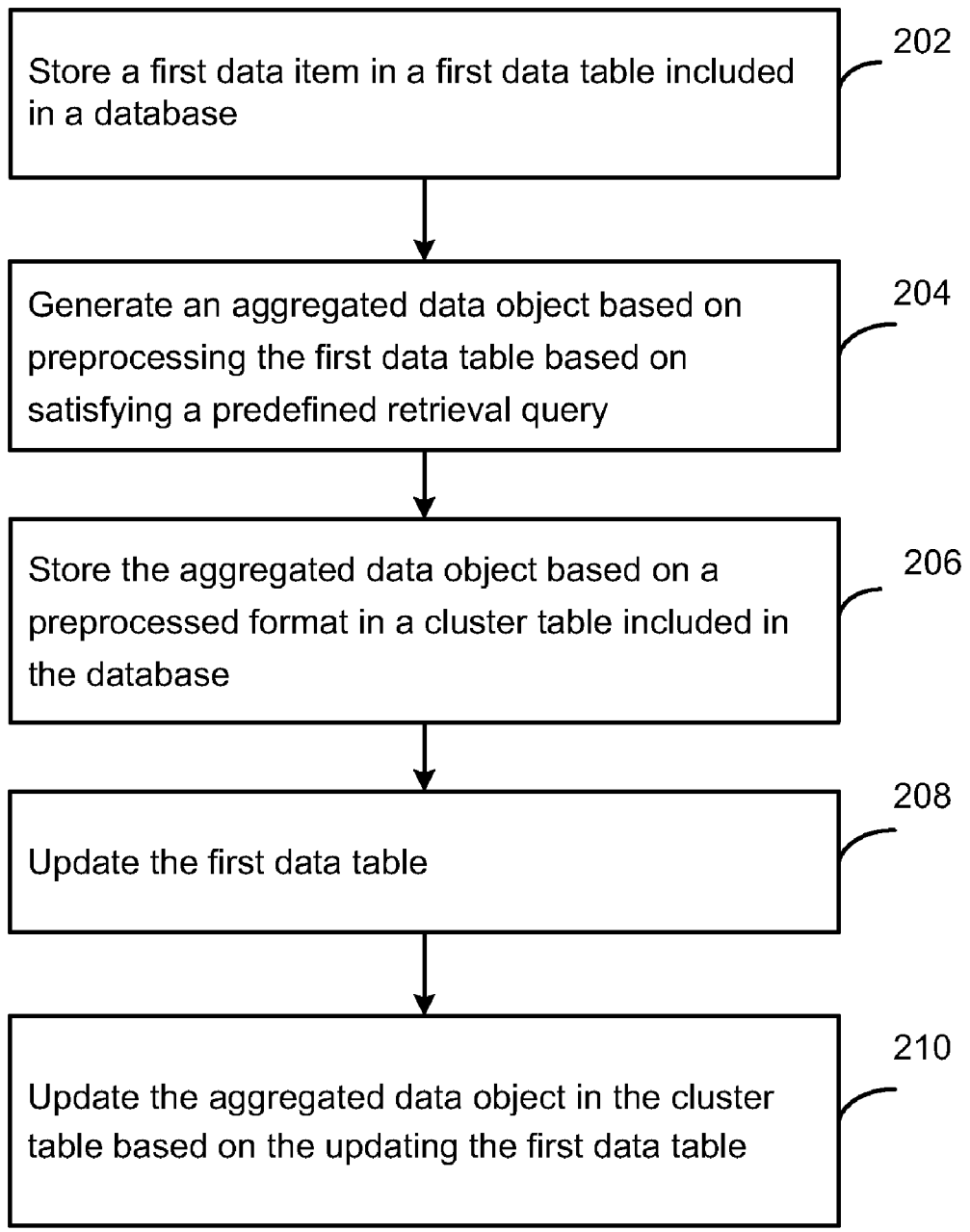
FIG. 2 is a flowchart illustrating an operation of the system of FIG. 1 according to an example embodiment.

FIG. 2 is a flowchart illustrating an operation of the system of FIG. 1. According to an example embodiment, a method may include storing a first data item in a first data table included in a database (202). For example, the data table update processor 116 may store the first data item in one of the data tables 110a, 110b as discussed previously.

According to an example embodiment, the method may further include generating an aggregated data object based on preprocessing the first data table based on satisfying a predefined retrieval query (204). For example, the aggregated object processor 118 may generate an aggregated data object based on preprocessing the first data table based on satisfying the predefined retrieval query. For example, the aggregated object processor 118 discussed previously may be configured to generate one of the aggregated data objects 114a, 114b based on preprocessing one or more of the data tables 110a, 110b. For example, the predefined retrieval query may be provided by the example user 106.

The method may further include storing the aggregated data object based on a preprocessed format in a cluster table included in the database (206). For example, the data hub storage manager 120 may store one of the aggregated data objects 114a, 114b based on a preprocessed format in the cluster table 112. Thus, when the user 106 needs to retrieve the data based on the retrieval query, one of the aggregated data objects 114a, 114b may be retrieved as a result of executing one instruction and one fetch from storage, instead of executing several instructions to process multiple fetches from the data tables 110a, 110b. The data item information may thus be stored simultaneously in the data tables 110a, 110b and in the cluster table 112, so that the example user 106 may retrieve desired information either from the data tables 110a, 110b via multiple fetch operations, or from the cluster table 112 via fewer fetch operations.

The method may further include updating the first data table (208), and updating the aggregated data object in the cluster table based on the updating the first data table (210). According to an example embodiment, the data table update processor 116 discussed previously may update one of the data tables 110a, 110b, and the data hub update processor 122 may update one of the aggregated data objects 114a, 114b in the cluster table 112 based on the update of the data table 110a, 110b.

According to an example embodiment, a request based on the predefined retrieval query may be received. For example, the database receiving device 124 may receive the request based on the predefined retrieval query. For example, the request may be received from the example user 106 via the user interface 104.

According to an example embodiment, the aggregated data object may be retrieved from the cluster table in response to the request. For example, the data hub retrieval manager 126 discussed previously may retrieve one of the aggregated data objects 114a, 114b from the cluster table 112 in response to the request.

According to an example embodiment, a second data item may be stored in a second data table included in the database, and the aggregated data object may be updated in the cluster table based on preprocessing the second data table based on satisfying the predefined retrieval query. For example, the data table update processor 116 may store the second data item in one of the data tables 110a, 110b as discussed previously, and the data hub update processor 122 may update one of the aggregated data objects 114a, 114b in the cluster table 112 based on preprocessing the second data table based on satisfying the predefined retrieval query.

According to an example embodiment, updating the first data table may include updating the first data item in the first data table and storing, in a timestamp data table included in the database, an indicator indicating a time associated with the update of the first data table. For example, the data table update processor 116 discussed previously may update one of the data tables 110a, 110b including updating data items in the data tables 110a, 110b and storing, in the timestamp data table 128 included in the database, an indicator indicating a time associated with the update of the data table.

According to an example embodiment, updating the aggregated data object in the cluster table may include retrieving the indicator indicating the time associated with the update of the first data table and storing the updated aggregated data object and the indicator indicating the time associated with the update of the first data table in the cluster table. For example, the data hub update processor 122 may update one of the aggregated data objects 114a, 114b in the cluster table 112 including retrieving the indicator indicating the time associated with the update of the data table and storing the updated aggregated data object 114a, 114b and the indicator indicating the time associated with the update of the data table in the cluster table 112.

According to an example embodiment, updating the first data table may include saving, in a memory, an object associated with the update of the first data table, and updating the aggregated data object in the cluster table may include selecting the aggregated data object in the cluster table for update based on the object saved in the memory. For example, if one of the data tables 110a, 110b is updated via an add, modify, or delete operation, objects associated with the update may be stored in the updated object memory 134 discussed previously so that the data hub manager 102 may "remember" the objects associated with the update so that the cluster table 112 may be updated in accordance with the update to the data tables 110a, 110b. For example, the data table update processor 122 may update the data table including saving, in the updated object memory 134, an object associated with the update of the data table, and the data hub update processor 122 may update one of the aggregated data objects 114a, 114b in the cluster table 112 including selecting the aggregated data object 114a, 114b in the cluster table 112 for update based on the object saved in the updated object memory 134.

According to an example embodiment, the method may include processing a request to update the aggregated data object based on one or more data items stored in a third data table included in an external database that is located external to the database, and updating the aggregated data object in the cluster table based on preprocessing the third data table based on satisfying the predefined retrieval query. For example, the external objects manager 142 discussed previously may process requests to update the aggregated data objects 114a, 114b based on one or more data items stored in one or more of the external data tables 140a, 140b included in the external database 136 that is located external to the database. According to an example embodiment, the data hub update processor 122 may be configured to update the aggregated data objects 114a, 114b in the cluster table 112 based on preprocessing one or more of the external data tables 140a, 140b based on satisfying the predefined retrieval query. For example, the user 106 may need information from external sources in addition to information from the database in order to satisfy one or more frequently used queries, and may thus include the external information in the aggregated data objects 114a, 114b stored in the cluster table 112. As discussed previously, the special language elements such as EXPORT TO DATABASE, IMPORT FROM DATABASE and DELETE FROM DATABASE may be used to process data associated with the cluster table 112. For example, an EXPORT instruction may be used to update the aggregated data object 114a based on data items stored in the external data tables 140a, 140b.

According to an example embodiment, processing the request may include processing the request to update the aggregated data object based on one or more data items stored in a third data table included in an external database that is located external to the database and storing, in a timestamp data table included in the database, an external update indicator indicating a time associated with the update of the aggregated data object based the one or more data items stored in the third table. According to an example embodiment, updating the aggregated data object in the cluster table may include preprocessing the third data table based on satisfying the predefined retrieval query and storing the updated aggregated data object and the external update indicator in the cluster table.

For example, the external objects manager 142 may process the request to update one of the aggregated data objects 114a, 114b based on one or more data items stored in one of the external data tables 140a, 140b included in the external database 136 that may be located external to the database, including storing, in the timestamp data table 128, an external update indicator indicating a time associated with the update of one of the aggregated data objects 114a, 114b based the one or more data items.

According to an example embodiment, the data hub update processor 122 may update one of the aggregated data objects 114a, 114b in the cluster table based on preprocessing one of the external data tables 140a, 140b based on satisfying the predefined retrieval query and storing the updated aggregated data object 114a, 114b and the external update indicator in the cluster table 112. Thus, the indicators may be checked for matching values, for example, by the data hub retrieval manager 126, to ensure retrieval of information based on the most recent updates.

Figure 3:
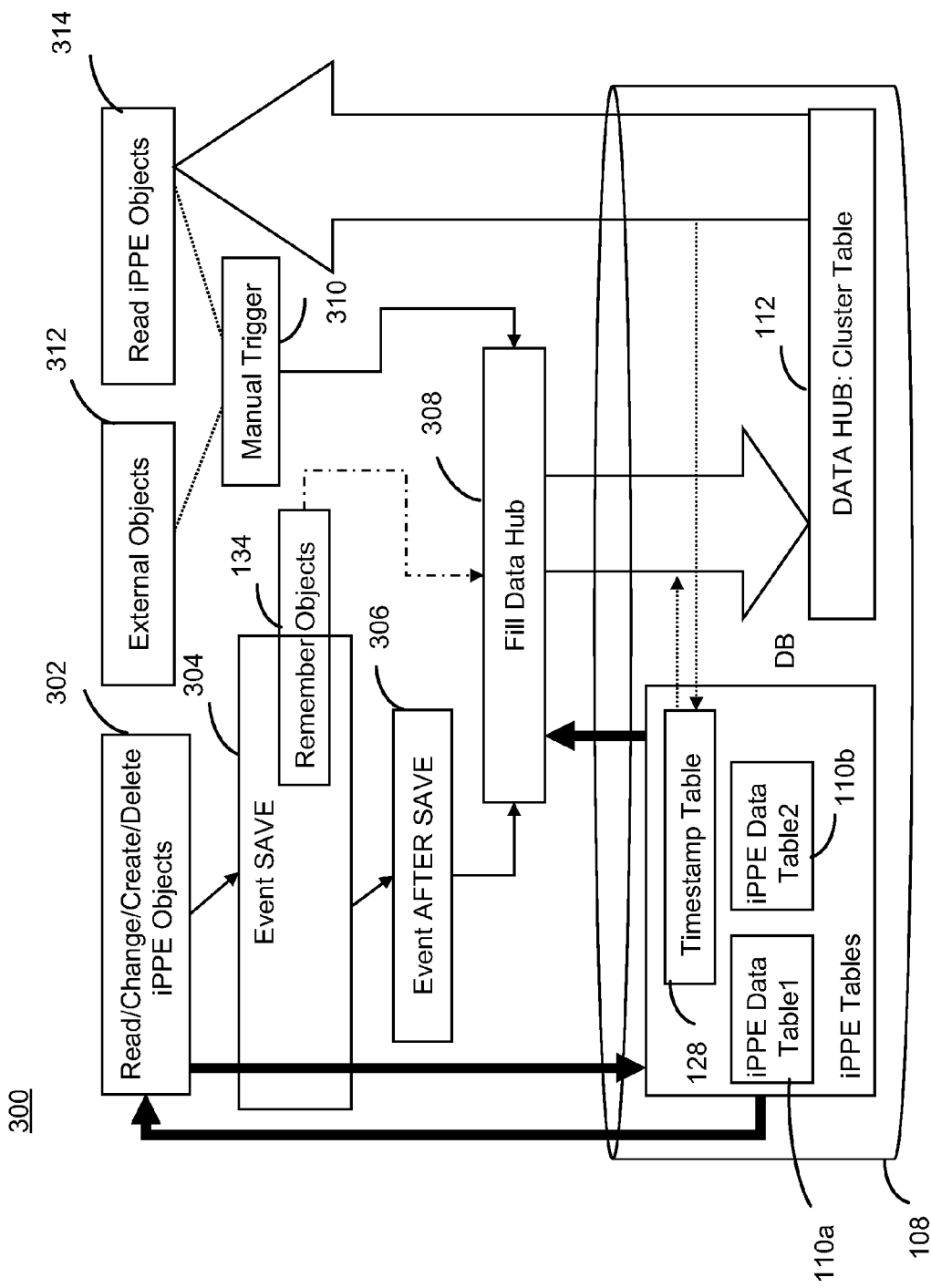
FIG. 3 is a block diagram of a system for managing complex database information according to an example embodiment.

FIG. 3 is a block diagram of a system 300 for managing complex database information according to an example embodiment. As shown in FIG. 3, the example system 300 may include the database storage area 108 that may be configured, for example, to store iPPE tables, including data tables 110a, 110b configured to store iPPE data items or objects, and the timestamp table 128 as discussed previously with regard to FIG. 1. As shown in FIG. 3, the example database storage area 108 may further include the cluster table 112 as discussed previously.

As shown in FIG. 3, the example system 300 may include one or more processors 302 configured to read/change/create/delete iPPE objects. For example, the data table update processor 116 discussed previously may read/change/create/delete iPPE objects in iPPE data tables 110a, 110b, and the timestamp data table 128. Upon updating one of the iPPE objects, a "SAVE" event 304 associated with saving information in the database storage area 108 may cause objects to be "remembered," or temporarily stored, for example, in the updated object memory 134 discussed previously. For example, if one of the data tables 110a, 110b is updated via an add, modify, or delete operation, objects associated with the update may be stored in the updated object memory 134 so that the data hub manager 102 may "remember" the objects associated with the update so that the cluster table 112 may be updated in accordance with the update to the data tables 110a, 110b. As discussed previously, the data table update processor 122 may update the data table including saving, in the updated object memory 134, an object associated with the update of the data table.

After updating one of the iPPE objects, an "AFTER SAVE" event 306 may cause objects that have been "remembered," or temporarily stored, for example, in the updated object memory 134 by a "SAVE" event, to be used for filling the data hub 108, or updating the cluster table 112. For example, the data hub update processor 122 may update one of the aggregated data objects 114a, 114b in the cluster table 112 including selecting the aggregated data object 114a, 114b in the cluster table 112 for update based on the object saved in the updated object memory 134.

According to an example embodiment, a manual trigger 310 may also cause data items to be updated in the cluster table 112. Thus, the cluster table 112 may be updated automatically, or may be updated based on the manual trigger, for example, via requests from the example user 106, via the user interface 104. For example, the external objects manager 142 discussed previously may process requests to update the aggregated data objects 114a, 114b based on or more one external objects 312. Further, iPPE objects may be retrieved 314 from the cluster table 112 via the manual trigger 310.

For example, if one or more data items stored in one or more of the external data tables 140a, 140b included in the external database 136 that is located external to the database are changed, the external objects manager 142 may cause updating of the cluster table 112 accordingly. Thus, the data hub update processor 122 may update the aggregated data objects 114a, 114b in the cluster table 112 based on preprocessing one or more of the external data tables 140a, 140b based on satisfying the predefined retrieval query. For example, the user 106 may need information from external sources in addition to information from the database in order to satisfy one or more frequently used queries, and may thus include the external information in the aggregated data objects 114a, 114b stored in the cluster table 112. As discussed previously, the special language elements such as EXPORT TO DATABASE, IMPORT FROM DATABASE and DELETE FROM DATABASE may be used to process data associated with the cluster table 112. For example, an EXPORT instruction may be used to update the aggregated data object 114a based on data items stored in the external data tables 140a, 140b.

According to an example embodiment, the external objects manager 142 may process requests to update the aggregated data objects 114a, 114b based on one or more data items stored in one of the external data tables 140a, 140b included in the external database 136 that may be located external to the database, including storing, in the timestamp data table 128, an external update indicator indicating a time associated with the update of one of the aggregated data objects 114a, 114b based the one or more data items.

According to an example embodiment, the data hub update processor 122 may update the aggregated data objects 114a, 114b in the cluster table 112 based on preprocessing one of the external data tables 140a, 140b based on satisfying the predefined retrieval query and storing the updated aggregated data object 114a, 114b and the external update indicator in the cluster table 112. Thus, the indicators may be checked for matching values, for example, by the data hub retrieval manager 126, to ensure retrieval of information based on the most recent updates.

According to an example embodiment, the data hub or cluster table 112 discussed previously may be included in an iPPE database, and may reduce the amount of retrieval time and processing time needed for the amount of data to be read from the data base during a run of an interface to another system. For example, the data stored in the data hub may be needed by different systems. Reading the data from multiple iPPE data tables with conventional APIs may adversely affect the performance of the system, at least in terms of retrieval time and processing time.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
    a database storage area including:
        data tables configured to store relational database data items, and
        a cluster table configured to store data objects;
    a data hub manager including:
        a data table update processor configured to store a first data item in a first one of the data tables,
        an aggregated object processor configured to generate an aggregated data object based on preprocessing the first data table based on satisfying a predefined retrieval query, the aggregated data object including data combined from a plurality of the data tables that satisfy the predefined retrieval query and which is stored as a physical record in a database and being larger than any of the plurality of data tables, and
        a data hub storage manager configured to store the aggregated data object based on a preprocessed format in the cluster table, the aggregated data object storing the relational database data items simultaneously with the plurality of data tables,
    wherein the data table update processor is configured to update the first data table,
    wherein the data hub storage manager further includes a data hub update processor configured to update the aggregated data object in the cluster table based on the updating of the first data table,
    wherein the database storage area includes a timestamp data table configured to store indicators of times associated with updates of data items in the data tables,
    wherein updating the first data table includes updating the first data item in the first data table and storing, in a timestamp data table included in the database, an indicator indicating a time associated with the update of the first data table, and
    wherein updating the aggregated data object in the cluster table includes retrieving the indicator indicating the time associated with the update of the first data table and storing the updated aggregated data object and the indicator indicating the time associated with the update of the first data table in the cluster table.

2. The system of claim 1 wherein the data hub manager further comprises:
    a database receiving device configured to receive a request based on the predefined retrieval query; and
    a data hub retrieval manager configured to retrieve the aggregated data object from the cluster table in response to the request.

3. The system of claim 1 wherein:
    the data table update processor is configured to store a second data item in a second data table included in the database, and
    the data hub update processor is configured to update the aggregated data object in the cluster table based on preprocessing the second data table satisfying the predefined retrieval query.

4. The system of claim 1 wherein the data hub manager further comprises:
    a database receiving device configured to receive a request based on the predefined retrieval query;
    a data timestamp retrieval manager configured to retrieve an indicator indicating a most recent time associated with the update of the first data table from the timestamp data table;
    a hub timestamp retrieval manager configured to retrieve, from the cluster table, an indicator indicating the time associated with the update of the first data table that is most recently saved in the cluster table; and
    a data hub retrieval manager configured to retrieve the aggregated data object from the cluster table in response to the request based on determining whether the indicator retrieved from the timestamp data table matches the indicator retrieved from the cluster table.

5. The system of claim 1 and further comprising:
    an updated object memory configured to temporarily store objects associated with updates of data tables included in the database, wherein:
    the data table update processor is configured to update the first data table including saving, in the updated object memory, an object associated with the update of the first data table, and
    the data hub update processor is configured to update the aggregated data object in the cluster table including selecting the aggregated data object in the cluster table for update based on the object saved in the updated object memory.

6. The system of claim 1 and further comprising:
    an external objects manager configured to process requests to update the aggregated data object based on one or more data items stored in a third data table included in an external database that is located external to the database, and
    wherein the data hub update processor is configured to update the aggregated data object in the cluster table based on preprocessing the third data table based on satisfying the predefined retrieval query.

7. The system of claim 6 wherein:
    the database storage area includes a timestamp data table configured to store indicators of times associated with updates of data items in the data tables,
    the external objects manager is configured to process requests to update the aggregated data object based on one or more data items stored in a third data table included in an external database that is located external to the database, including storing, in the timestamp data table, an external update indicator indicating a time associated with the update of the aggregated data object based the one or more data items stored in the third table, and
    the data hub update processor is configured to update the aggregated data object in the cluster table including updating the aggregated data object in the cluster table based on preprocessing the third data table based on satisfying the predefined retrieval query and storing the updated aggregated data object and the external update indicator in the cluster table.

8. The system of claim 1 wherein the database includes a relational database.

9. The system of claim 1 wherein the first data item includes an integrated Product and Process Engineering (iPPE) object and the first data table includes an iPPE data table.

10. The system of claim 1, wherein the data object includes data written in a compressed form.

11. The system of claim 1, wherein the data object includes data written in a binary format.

12. A method comprising:
storing data tables configured to store relational database data items;
storing a first data item in a first data table included in a database;
generating an aggregated data object based on preprocessing the first data table based on satisfying a predefined retrieval query, the aggregated data object including data combined from a plurality of the data tables that satisfy the predefined retrieval query and which is stored as a physical record in a database and being larger than the first data table;
storing the aggregated data object based on a preprocessed format in a cluster table included in the database, the cluster table storing the first data item simultaneously with the first data table;
updating the first data table; and
updating the aggregated data object in the cluster table based on the updating the first data table,
wherein updating the first data table comprises updating the first data item in the first data table and storing, in a timestamp data table included in the database, an indicator indicating a time associated with the update of the first data table, and
wherein updating the aggregated data object in the cluster table comprises retrieving the indicator indicating the time associated with the update of the first data table and storing the updated aggregated data object and the indicator indicating the time associated with the update of the first data table in the cluster table.

13. The method of claim 12 and further comprising:
receiving a request based on the predefined retrieval query; and
retrieving the aggregated data object from the cluster table in response to the request.

14. The method of claim 12 and further comprising:
storing a second data item in a second data table included in the database; and
updating the aggregated data object in the cluster table based on preprocessing the second data table based on satisfying the predefined retrieval query.

15. The method of claim 12 and further comprising:
receiving a request based on the predefined retrieval query;
retrieving an indicator indicating a most recent time associated with the update of the first data table from the timestamp data table;
retrieving an indicator indicating the time associated with the update of the first data table from the cluster table that is most recently saved in the cluster table; and
retrieving the aggregated data object from the cluster table in response to the request based on determining whether the indicator retrieved from the timestamp data table matches the indicator retrieved from the cluster table.

16. The method of claim 12 wherein:
updating the first data table comprises saving, in a memory, an object associated with the update of the first data table, and
updating the aggregated data object in the cluster table comprises selecting the aggregated data object in the cluster table for update based on the object saved in the memory.

17. The method of claim 12 and further comprising:
processing a request to update the aggregated data object based on one or more data items stored in a third data table included in an external database that is located external to the database; and
updating the aggregated data object in the cluster table based on preprocessing the third data table based on satisfying the predefined retrieval query.

18. The method of claim 17 wherein:
processing the request comprises processing the request to update the aggregated data object based on one or more data items stored in a third data table included in an external database that is located external to the database and storing, in a timestamp data table included in the database, an external update indicator indicating a time associated with the update of the aggregated data object based on the one or more data items stored in the third table, and
updating the aggregated data object in the cluster table comprises preprocessing the third data table based on satisfying the predefined retrieval query and storing the updated aggregated data object and the external update indicator in the cluster table.

19. A computer program product being tangibly embodied on a computer-readable storage medium and being configured to cause a data processing apparatus to:
store data tables configured to store relational database data items;
store a first data item in a first data table included in a database;
generate an aggregated data object based on preprocessing the first data table based on satisfying a predefined retrieval query, the aggregated data object including data combined from a plurality of the data tables that satisfy the predefined retrieval query and which is stored as a physical record in a database and being larger than the first data table;
store the aggregated data object based on a preprocessed format in a cluster table included in the database, the cluster table storing the first data item simultaneously with the first data table;
update the first data table; and
update the aggregated data object in the cluster table based on the updating of the first data table,
wherein updating the first data table comprises updating the first data item in the first data table and storing, in a timestamp data table included in the database, an indicator indicating a time associated with the update of the first data table, and
wherein updating the aggregated data object in the cluster table comprises retrieving the indicator indicating the time associated with the update of the first data table and storing the updated aggregated data object and the indicator indicating the time associated with the update of the first data table in the cluster table.

20. The computer program product of claim 19, further configured to cause the data processing apparatus to:
receive a request based on the predefined retrieval query; and
retrieve the aggregated data object from the cluster table in response to the request.

* * * * *